US012714142B2

(12) United States Patent
Batista et al.

(10) Patent No.: US 12,714,142 B2
(45) Date of Patent: Aug. 25, 2026

(54) HANDHELD AEROSOL-GENERATING DEVICE WITH OPENING ELEMENT

(71) Applicant: Philip Morris Products S.A., Neuchatel (CH)

(72) Inventors: Rui Nuno Rodrigues Alves Batista, Morges (CH); Daria Tzimoulis, La Croix-sur-Lutry (CH); Adela Sahraoui, Lausanne (CH)

(73) Assignee: Philip Morris Products S.A., Neuchatel (CH)

( * ) Notice: Subject to any disclaimer, the term of this patent is extended or adjusted under 35 U.S.C. 154(b) by 560 days.

(21) Appl. No.: 18/258,692

(22) PCT Filed: Dec. 17, 2021

(86) PCT No.: PCT/EP2021/086424
§ 371 (c)(1),
(2) Date: Jun. 21, 2023

(87) PCT Pub. No.: WO2022/136153
PCT Pub. Date: Jun. 30, 2022

(65) Prior Publication Data
US 2024/0041110 A1 Feb. 8, 2024

(30) Foreign Application Priority Data
Dec. 22, 2020 (EP) .................................... 20386063

(51) Int. Cl.
*A24F 40/42* (2020.01)
*A24F 40/05* (2020.01)
(Continued)

(52) U.S. Cl.
CPC .............. *A24F 40/42* (2020.01); *A24F 40/05* (2020.01); *A24F 40/10* (2020.01); *A24F 40/46* (2020.01); *A24F 40/485* (2020.01); *B05B 17/06* (2013.01)

(58) Field of Classification Search
CPC ....................................................... A24F 40/42
See application file for complete search history.

(56) References Cited

U.S. PATENT DOCUMENTS

2015/0040929 A1* 2/2015 Hon ........................ A24F 40/42 392/394
2015/0367366 A1 12/2015 Edwards et al.
(Continued)

FOREIGN PATENT DOCUMENTS

AU 2017243763 B2 8/2018
CA 3 017 429 A1 12/2017
(Continued)

OTHER PUBLICATIONS

Korean Office Action issued Jul. 15, 2025, in Korean Patent Application No. 10-2023-7020544 (with English translation), 9 pages.
(Continued)

*Primary Examiner* — Philip Y Louie
*Assistant Examiner* — Michael T Fulton
(74) *Attorney, Agent, or Firm* — Oblon, McClelland, Maier & Neustadt, L.L.P.

(57) ABSTRACT

A handheld aerosol-generating device is provided, including a cartridge receiving region configured to receive a cartridge, the cartridge including a liquid aerosol-forming substrate, in which the cartridge receiving region includes an opening element, in which the opening element is configured to pierce a sealing foil of the cartridge when the cartridge is received in the cartridge receiving region, and in
(Continued)

which the cartridge receiving region is configured to receive the cartridge transversally from either of both sides of the device. A handheld aerosol-generating system including the handheld aerosol-generating device is also provided. A method of attaching a cartridge including a liquid aerosol-forming substrate with a handheld aerosol-generating device is also provided.

19 Claims, 3 Drawing Sheets

(51) Int. Cl.

| | |
|---|---|
| ***A24F 40/10*** | (2020.01) |
| ***A24F 40/46*** | (2020.01) |
| ***A24F 40/485*** | (2020.01) |
| ***B05B 17/06*** | (2006.01) |

(56) References Cited

U.S. PATENT DOCUMENTS

| | | | | |
|---|---|---|---|---|
| 2018/0071274 | A1 | 3/2018 | Havercroft et al. | |
| 2018/0104214 | A1 | 4/2018 | Raichman | |
| 2018/0132535 | A1 | 5/2018 | Reevell | |
| 2019/0254346 | A1* | 8/2019 | Hepworth | A61M 15/06 |
| 2020/0359683 | A1 | 11/2020 | Reevell | |

FOREIGN PATENT DOCUMENTS

| | | | |
|---|---|---|---|
| CN | 204070553 | U | 1/2015 |
| CN | 107404949 | A | 11/2017 |
| CN | 111938201 | A | 11/2020 |
| CN | 106998817 | B | 11/2021 |
| EP | 3 463 534 | A1 | 4/2019 |
| EP | 3 744 188 | A1 | 12/2020 |
| JP | 2005-34021 | A | 2/2005 |
| JP | 2019-505192 | A | 2/2019 |
| KR | 10-2019-0143725 | | 12/2019 |
| RU | 2 651 452 | C1 | 4/2018 |
| RU | 2 720 972 | C2 | 5/2020 |
| WO | WO 2018/086828 | A1 | 5/2018 |

OTHER PUBLICATIONS

International Search Report and Written Opinion issued Apr. 5, 2022 in PCT/EP2021/086424 filed on Dec. 17, 2021, 12 pages.

International Report on Patentability and Written Opinion issued Jun. 13, 2023 in PCT/EP2021/086424, 7 pages.

Combined Chinese Office Action and Search Report issued Oct. 23, 2025, in corresponding Chinese Patent Application No. 202180084501.0 (with English Translation), 14 pages.

Combined Russian Office Action and Search Report issued Dec. 11, 2023 in Russian Patent Application No. 2023116367/03 (submitting English Translation only), 6 pages.

Japanese Office Action issued Jul. 22, 2024 in Japanese Patent Application No. 2023-537612 (with English Translation), 5 pages.

* cited by examiner

HANDHELD AEROSOL-GENERATING DEVICE WITH OPENING ELEMENT

The present invention relates to an aerosol-generating device.

It is known to provide an aerosol-generating device for generating an inhalable vapor. Such devices may heat aerosol-forming substrate to a temperature at which one or more components of the aerosol-forming substrate are volatilised without burning the aerosol-forming substrate. Aerosol-forming substrate may be provided as part of an aerosol-generating article. The aerosol-generating article may have a rod shape for insertion of the aerosol-generating article into a cavity, such as a heating chamber, of the aerosol-generating device. A heating element may be arranged in or around the heating chamber for heating the aerosol-forming substrate once the aerosol-generating article is inserted into the heating chamber of the aerosol-generating device. In addition or alternatively, a cartridge comprising a liquid aerosol-forming substrate may be attached to the aerosol-generating device for supplying the liquid aerosol-forming substrate to the device for aerosol generation. The cartridge my comprise a sealing foil configured for sealing the liquid aerosol-forming substrate of the cartridge during transport of the cartridge and before usage of the cartridge. Before usage of the cartridge, a user may have to peel off the sealing foil.

Peeling off of the sealing foil from the cartridge may result in undesired leakage of liquid aerosol-forming substrate from the cartridge before use. Undesired leakage of liquid aerosol-forming substrate may also be an issue during attachment of the cartridge to the aerosol-generating device.

It would be desirable to have an aerosol-generating device with leakage prevention. It would be desirable to have an aerosol-generating device with leakage prevention of a cartridge during attachment of the cartridge with the aerosol-generating device. It would be desirable to have a cartridge with leakage prevention before use. It would be desirable to have a cartridge with leakage prevention during attachment of the cartridge with an aerosol-generating device.

According to an embodiment of the invention there is provided a handheld aerosol-generating device that may comprise a cartridge receiving region configured for receiving a cartridge. The cartridge may comprise a liquid aerosol-forming substrate. The cartridge receiving region may comprise an opening element. The opening element may be configured to pierce a sealing foil of the cartridge, when the cartridge is received in the cartridge receiving region.

According to an embodiment of the invention there is provided a handheld aerosol-generating device comprising a cartridge receiving region configured for receiving a cartridge. The cartridge comprises a liquid aerosol-forming substrate. The cartridge receiving region comprises an opening element. The opening element is configured to pierce a sealing foil of the cartridge, when the cartridge is received in the cartridge receiving region.

The cartridge may be provided with the sealing foil during production or during packing for shipping. As a consequence, the cartridge will typically be purchased by a user comprising the sealing foil. The sealing foil is arranged to prevent leakage of the liquid sensorial media out of the cartridge before usage. The liquid sensorial media is a liquid aerosol-forming substrate. Before use, a user would conventionally have to manually remove the sealing foil. This is cumbersome. Additionally, leakage of the liquid sensorial media from the cartridge may be the result of a user manually removing the sealing foil. Finally, leakage of the liquid sensorial media from the cartridge may have been that during attachment of the cartridge with the aerosol-generating device after the sealing foil has been removed by the user. All of these problems are overcome by the provisioning of the opening element in the cartridge receiving region of the aerosol-generating device.

The opening element will automatically open of the sealing foil of the cartridge, when the cartridge is received in the aerosol-generating device via the cartridge receiving region. As a consequence, a user does not have to manually remove the sealing foil from the cartridge before usage of the cartridge. A user can simply insert the cartridge into the cartridge receiving region of the aerosol-generating device without bothering with the sealing foil. The opening element will automatically open the cartridge so that the liquid sensorial media can be supplied from the cartridge to the aerosol-generating device for aerosol generation.

The cartridge receiving region may comprise a liquid passage. The liquid passage may be configured for enabling the liquid sensorial media from the cartridge to flow out of the cartridge and into the aerosol-generating device.

The liquid passage may be arranged to establish a liquid connection between the handheld aerosol-generating device and the cartridge, when the cartridge is received in the cartridge receiving region and the sealing foil is pierced by the opening element.

The opening element may at least partly surround the liquid passage. The opening element may fully surround the liquid passage. This has the advantage that the liquid sensorial media from the cartridge will directly flow into the liquid passage after the opening element has opened the sealing foil from the cartridge. This will prevent leakage of the liquid sensorial media.

The opening element may comprise a blade for slicing the sealing foil of the cartridge, when the cartridge is received in the cartridge receiving region. The opening element may thus be configured as a slicing element. The blade may be arranged to smoothly cut the sealing foil during insertion of the cartridge into the cartridge receiving region.

The opening element may comprise a double-blade for slicing the sealing foil of the cartridge, when the cartridge is received in the cartridge receiving region. The double-blade may have two cutting edges, preferably two opposite cutting edges, more preferably two opposite cutting edges facing opposite directions. The double-blade may be configured to slice the sealing foil of the cartridge independently of the insertion direction of the cartridge into the cartridge receiving region. The first of the blades may be configured to cut the sealing foil, when the cartridge is inserted into the cartridge receiving region in a first transversal direction. The second blade may be configured to cut the sealing foil, when the cartridge is inserted into the cartridge receiving region in a second transversal direction opposite to the first transversal direction. The first and second blade may be part of one opening element.

The opening element may be configured as a piercing element. The opening element may comprise a piercing element alternatively or additionally to any of the opening element configurations such as a blade-type configuration. The piercing element may be configured as a pin or needle. The opening element may facilitate different opening mechanism such as slicing, cutting and piercing at the same time.

The handheld aerosol-generating device may further comprise a sealing element. The sealing element may be arranged to prevent leakage of liquid aerosol-forming substrate, when the cartridge is received in the cartridge receiving region and the sealing foil is pierced by the opening element.

The sealing element may at least partly surround the opening element. The sealing element may fully surround the opening element. The sealing element may comprise a sealing ring. The sealing element may be a sealing ring. The sealing element may comprise an O-ring. The sealing element may be an O-ring.

The handheld aerosol-generating device may further comprise a vaporizer. The vaporizer may be configured as a nebulizer. The nebulizer may comprise a vibrating micro-perforated mesh. The vibrating micro-perforated mesh may comprise a palladium perforated vibrating plate.

The vaporizer may be fluidly connected with the cartridge, when the cartridge is received in the cartridge receiving region and the sealing foil is pierced by the opening element.

The vaporizer may be fluidly connected with the cartridge via the liquid passage. After the opening element has opened the sealing foil of the cartridge, the liquid sensorial media can flow out of the cartridge, through the liquid passage of the cartridge receiving region and to the vaporizer to be vaporized.

The cartridge receiving region may be configured to receive the cartridge transversally from either of both sides of the device.

The cartridge receiving region and the opening element may be arranged in a non-thermal aerosol-generating portion of the handheld aerosol-generating device. The handheld aerosol-generating device may further comprise a thermal aerosol-generating portion comprising a heating element. The non-thermal aerosol-generating portion may be arranged upstream of the thermal aerosol-generating portion.

The invention further relates to a handheld aerosol-generating system comprising a handheld aerosol-generating device as described herein and a cartridge as described herein, the cartridge comprising a liquid aerosol-forming substrate as described herein.

The cartridge may comprise a liquid outlet allowing the liquid aerosol-forming substrate to flow out of the cartridge. The liquid outlet may be sealed by a sealing foil. The sealing foil may be arranged to be pierced by the opening element, when the cartridge is received in the cartridge receiving region.

The cartridge receiving region and the cartridge may be configured to allow transversal insertion of the cartridge into the cartridge receiving region from either of both sides of the device.

The invention further relates to a method of attaching a cartridge comprising a liquid aerosol-forming substrate with a handheld aerosol-generating device, the method may comprise the steps of:

- providing a handheld aerosol-generating system as described herein,
- inserting the cartridge into the cartridge receiving region of the handheld aerosol-generating device,
- piercing, by means of the opening element, the sealing foil of the cartridge thereby establishing a fluid connection between the cartridge and the handheld aerosol-generating device.

The invention further relates to a method of attaching a cartridge comprising a liquid aerosol-forming substrate with a handheld aerosol-generating device, the method comprising the steps of:

providing a handheld aerosol-generating system as described herein, inserting the cartridge into the cartridge receiving region of the handheld aerosol-generating device, piercing, by means of the opening element, the sealing foil of the cartridge thereby establishing a fluid connection between the cartridge and the handheld aerosol-generating device.

The aerosol-generating device may comprise a cartridge receiving region configured for receiving a cartridge.

The cartridge receiving region may comprise a liquid passage. The liquid passage may be arranged to establish a liquid connection between the aerosol-generating device and the cartridge, when the cartridge is received in the cartridge receiving region. The liquid passage may be configured as an aperture. The liquid passage may have a circular cross-section. The liquid passage may be tubular.

The cartridge receiving region may comprise an opening element. The opening element may be configured for opening a sealed cartridge upon insertion of the cartridge into the cartridge receiving region. The opening element may be configured for tearing or rupturing a sealing foil of the cartridge. The opening element may comprise a piercing element configured to pierce a sealing foil of the cartridge, when the cartridge is received in the cartridge receiving region. The opening element may comprise a blade-like element configured for cutting open or slicing a sealing foil of the cartridge, when the cartridge is received in the cartridge receiving region. The opening element may comprise a double-blade configured for cutting open or slicing a sealing foil of the cartridge, when the cartridge is received in the cartridge receiving region. The double-blade may be configured to slice the sealing foil of the cartridge independent of the insertion direction of the cartridge into the cartridge receiving region.

The cartridge receiving region may comprise a connection portion configured to establish a fluid connection with the cartridge. The orientation of the connection portion may be defined by an extension plane of the connection portion. The extension plane may be arranged at an angle with respect to the longitudinal axis of the aerosol-generating device. The liquid passage may be arranged centrally at the connection portion.

The angle between the extension plane of the connection portion and the longitudinal axis of the aerosol-generating device may be between 30° and 60°, preferably between 35° and 55°, more preferably between 40° and 50°, most preferred about 45°.

An extension plane of a surface of the vaporizer surface may be parallel to the extension plane of the connection portion. A snug connection may be established between the vaporiser and the connection portion such that liquid from the cartridge can reach the vaporiser through the liquid passage.

The cartridge receiving region may be configured as a recess. The cartridge receiving region and cartridge may be correspondingly shaped using a lock-and-key principle. The cartridge receiving region may comprise a non-symmetrical shape to allow insertion of the cartridge into the cartridge receiving region only for distinct spatial orientations of the cartridge with respect to the device. The non-symmetrical shape of the cartridge receiving region may be non-symmetrical with respect to a transversal plane of the device.

The cartridge receiving region may have a non-symmetrical shape to prevent insertion of the cartridge into the cartridge receiving region in an unwanted orientation. Thereby, it may be ensured that the cartridge is only inserted in the correct orientation such that a liquid outlet of the inserted cartridge may coincide with a connection portion of the cartridge receiving portion.

The cartridge receiving region may be shaped to allow insertion of the cartridge into the cartridge receiving region in a transversal direction with respect to the longitudinal axis of the aerosol-generating device. The cartridge receiving region may be shaped to only allow insertion of the cartridge into the cartridge receiving region unidirectionally. Thereby, an upside-down insertion of the cartridge may be prevented.

The cartridge receiving region may comprise a first cartridge receiving region sidewall and an opposite second cartridge receiving region sidewall. The first cartridge receiving region sidewall may have a different shape than the second cartridge receiving region sidewall. One or both of the first sidewall and the second sidewall may have an opening enabling insertion of the cartridge into the cartridge receiving region in the transversal direction. The cartridge receiving region may comprise a top cartridge receiving region wall and a bottom cartridge receiving region wall. The top cartridge receiving region wall may have a different shape than the bottom cartridge receiving region wall.

The aerosol-generating device may further comprise a sealing element. The sealing element may form part of the cartridge receiving region. The sealing element may be arranged to prevent leakage of liquid aerosol-forming substrate, when the cartridge is received in the cartridge receiving region and the sealing foil of the cartridge is pierced by the piercing element. The sealing element may be arranged to establish a liquid-tight seal between the cartridge and the cartridge receiving region, when the cartridge is received in the cartridge receiving region and the sealing foil is pierced by the piercing element. The sealing element may at least partly surround the opening element, preferably fully surrounds the opening element. The sealing element may comprise a sealing ring. The sealing element may be a sealing ring. The sealing element may comprise an O-ring. The sealing element may be an O-ring.

The cartridge may comprise a liquid storage portion for holding a liquid sensorial media. The liquid storage portion may comprise a liquid sensorial media. The liquid sensorial media may comprise water. The liquid sensorial media may comprise a flavorant. The liquid sensorial media may comprise nicotine. The liquid sensorial media may comprise, or may be, an aerosol-forming substrate. The cartridge may comprise a liquid aerosol-forming substrate.

The cartridge may comprise a semi-elastic material, preferably wherein the cartridge is made of a semi-elastic material, more preferably wherein the cartridge is made of a polymeric compound, most preferred wherein the cartridge is made of one or more of: cyclo-olefin copolymer (COC), cyclo-olefin polymer (COP) and polypropylene (PP).

The cartridge may comprise a liquid outlet. The liquid outlet of the cartridge may be sealed with a laminated foil ultra-sound welded to the cartridge. The foil may comprise, or be made of, laminated layers of aluminium foil and one or more layers of polymeric foil. The polymeric foil may comprise one or more of: BOPP (biaxial oriented polypropylene), LDPE (low-density polyethene), LLDPE (linear low-density polyethene), OPP (oriented polypropylene), PA (polyamide), PE (polyethene), PET (polyethene terephthalate), PP (polypropylene), PVC (polyvinyl chloride) and PVDC (polyvinylidene chloride).

The orientation of the liquid outlet may be defined by an extension plane of the liquid outlet. The extension plane of the liquid outlet may be arranged at an angle with respect to a longitudinal axis of the cartridge. The angle between the extension plane of the liquid outlet and the longitudinal axis of the cartridge may be between 30° and 60°, preferably between 35° and 55°, more preferably between 40° and 50°, most preferred about 45°. The liquid outlet may be angled identical to the angle of the connection portion to achieve an improved fit of the liquid outlet with the connection portion. When the cartridge is connected, the liquid outlet is aligned with the liquid passage so that liquid from the cartridge can flow to the vaporiser via the liquid outlet and the liquid passage.

The cartridge may comprise a first cartridge sidewall and an opposite second cartridge sidewall. The first cartridge sidewall may have a different shape than the second cartridge sidewall. The cartridge may comprise a top cartridge wall and a bottom cartridge wall. The top cartridge wall may have a different shape than the bottom cartridge wall. The cartridge may be shaped to allow insertion of the cartridge into the cartridge receiving region in a single orientation. The cartridge may be shaped to only allow unidirectional insertion of the cartridge into the cartridge receiving region. The cartridge may have a non-symmetrical shape.

A wall of a cartridge may be transparent such that the liquid contained in the liquid storage portion may be visible from the outside. A user may distinguish between different liquids based on a colour of the liquid. A wall of a cartridge may be transparent such that emptying of the liquid storage portion may be visible from the outside.

The cartridge may comprise one or more semi-open inlets. This may enable ambient air to enter the cartridge and the liquid storage portion. The one or more semi-open inlets may be semi-permeable membranes or one-way valves, permeable to allow ambient air into the liquid storage portion and impermeable to substantially prevent air and liquid inside the liquid storage portion from leaving the liquid storage portion. The one or more semi-open inlets may enable air to pass into the liquid storage portion under specific conditions. A vacuum created during depletion of the cartridge may be prevented by the one or more semi-open inlets. The one or more semi-open inlets of the cartridge may comprise a one-way valve. The one-way valve may be configured to open in response to a pressure drop in the liquid storage portion. The one-way valve may further prevent leakage of liquid out of the one or more semi-open inlets.

The liquid storage portion of the cartridge may be refillable. Alternatively, the cartridge may be configured as a replaceable cartridge. A new cartridge may be attached to the aerosol-generating device when the initial cartridge is spent.

The liquid outlet of the cartridge may comprise a one-way valve. The one-way valve may be configured to open in response to a pressure drop in the liquid storage portion. The one-way valve may be configured to open in response to a pressure drop in the airflow path. The one-way valve may further prevent contamination of the liquid storage portion by hindering any residues from entering into the liquid storage portion via the liquid outlet.

The aerosol-generating device may comprise a vaporizer. The vaporizer may be a humidifier. The vaporizer may be a nebulizer. The vaporizer may be a non-thermal vaporizer or a thermal vaporizer. The thermal vaporizer may comprise an electrical heating element for generating an aerosol by heating and vaporising a liquid sensorial media. The device may comprise two or more vaporizers selected from one or both of non-thermal vaporizers and thermal vaporizer. The device may comprise one non-thermal vaporizer and one thermal vaporizer. The one or more vaporizers may be part of a non-thermal aerosol-generating portion of the device.

The vaporizer may comprise a mesh element defining one or more nozzles, wherein the device is arranged to supply the liquid aerosol-forming substrate to one side of the mesh element. The mesh element may be vibrated against the supply of liquid sensorial media to generate an aerosol by forcing droplets of liquid sensorial media through the nozzles. This arrangement may be referred to as an active mesh element. The mesh may be a vibrating micro-perforated mesh comprising a palladium perforated vibrating plate.

Alternative arrangements may comprise an actuator arranged to vibrate the supply of liquid sensorial media against the mesh element to force droplets of liquid sensorial media through the nozzles. This arrangement may be referred to as a passive mesh element.

The actuator may comprise any suitable type of actuator. In some embodiments, the actuator may comprise a piezoelectric element. In some embodiments, the actuator may comprise an ultrasonic sonotrode.

The vaporizer may be actuated at a resonant frequency. The resonant frequency is a function of one or more of the following: viscosity of the liquid sensorial media (possibly lowered by increasing its temperature above room temperature and below 100 degrees Celsius); surface tension of the liquid sensorial media; nozzle diameter and geometry; mesh thickness or rigidity; speed of droplet ejection; amplitude of actuation; vaporizer assembly mechanical characteristics. The resonant frequency may be calculated based on a combination of the above factors. With the mesh as described above, it is possible to achieve the formation of droplets the diameters of which are typically below 3 micrometers. To decrease the diameter of the droplets formed, the viscosity of the of the liquid sensorial media may be lowered by increasing its temperature. To decrease the diameter of the droplets formed, an appropriate actuation frequency could be used, for example the resonant frequency as described above.

A vaporizer comprising a mesh element will exhibit a minimum droplet size that may be generated by the vaporizer for a particular liquid sensorial media. Typically, a small droplet size is desired to maximise pulmonary delivery of an aerosolised liquid aerosol-forming substrate.

The mesh element may comprise any suitable material. For example, the mesh element may comprise silicon-on-insulator wafer.

The mesh element may comprise a first surface and a second surface. A plurality of nozzles may extend between the first surface and the second surface. The first surface may be at least partially coated with a hydrophilic coating or the second surface may be at least partially coated with a hydrophobic coating. The hydrophobic coating may comprise either polyurethane (PU) or a super-hydrophobic metal such as a microporous metal or a metal mesh. The microporous metal or metal mesh may be functionalised with carbon chains to make the microporous metal or metal mesh super-hydrophobic. Exemplary super-hydrophobic metals include copper and aluminium.

In some embodiments, the mesh element comprises a hydrophilic coating on the inner surface. The mesh element may comprise a hydrophilic coating on the at least one nozzle surface. Hydrophilic coatings may comprise at least one of 3 polyamide, polyvinyl acetate (PVAc), cellulose acetate, cotton, and one or more hydrophilic oxides. Suitable hydrophilic oxides include silicon dioxide, aluminium oxide, titanium dioxide, and tantalum pentoxide.

The mesh element may comprise an electrical heating element positioned on a surface of the mesh element. Advantageously, the electrical heating element may be used to heat a liquid to be ejected through the nozzles of the mesh element. The electrical heating element may be arranged to directly heat a liquid to be ejected through the plurality of nozzles. The electrical heating element may be positioned on the outer surface of the mesh element. The electrical heating element may comprise any suitable type of heating element. For example, the electrical heating element may comprise a microelectromechanical systems heating element. The electrical heating element may comprise one or more resistive heating tracks. The one or more resistive heating tracks may comprise a metal. The one or more resistive heating tracks may comprise at least one of platinum, nickel, and polysilicon.

The vaporizer may further comprise an elastically deformable element. The vaporizer may further comprise a cavity positioned between the mesh element and the elastically deformable element. The vaporizer may comprise a liquid inlet for providing a supply of liquid to be atomized to the cavity. The cavity may contain the liquid to be atomized. The liquid outlet of the cartridge may be fluidly connected with the liquid inlet of the vaporizer. The vaporizer may further comprise an actuator arranged to oscillate the elastically deformable element. The elastically deformable element may comprise any suitable elastically deformable material. For example, the elastically deformable element may comprise plastic, rubber or silicon. In some preferred embodiments, the elastically deformable element comprises silicon. In some embodiments, the elastically deformable element may comprise a metal or a metal alloy, such as nickel, palladium or an alloy of nickel and palladium.

A vaporizer may generate a dispersion that is a vapor or an aerosol. A vaporizer may generate the vapor or aerosol via heating a liquid sensorial media to vaporize or aerosolize at least a portion of the liquid sensorial media. A vaporizer may generate a dispersion that is vapor or an aerosol by non-heating such as by sonication, vibration or a combination of sonication and vibration. For example, a nebulizer may include a vibrator or sonicator rod. The nebulizer may be an atomizer assembly, and the atomizer assembly may further include a mechanical element that includes one or more of a valve, pump, sprayer, some combination thereof, or the like. One or more portions of the nebulizer, including the vibrator or sonicator rod may exert a force on the liquid sensorial media to generate a dispersion that is an aerosol. For example, an atomizer assembly may be configured to generate an aerosol via one or more of releasing a pressurized liquid sensorial media into a lower-pressure environment, spraying liquid sensorial media particles, evaporating volatile liquid sensorial media into an environment.

The vaporizer may be a humidifier. The humidifier may be configured as a non-thermal humidifier. The humidifier may be configured as a nebulizer. The nebulizer may comprise a vibrating micro-perforated mesh. The vibrating micro-perforated mesh may comprise a palladium perforated vibrating plate.

The aerosol-generating device may comprise a humidity sensor configured to measure the humidity in the airflow path. The humidity sensor may be arranged in the airflow path. Preferably, the humidity sensor is arranged adjacent an air inlet fluidly connected with the airflow path. Alternatively or additionally, the humidity sensor may measure the humidity of the ambient air surrounding the aerosol-generating device. The humidity sensor may be arranged at the periphery of the aerosol-generating device to measure the ambient humidity. The humidity sensor may be configured as a band-gap sensor.

The aerosol-generating device may comprise a temperature sensor. The temperature sensor may be configured to measure the temperature of the air in the airflow path. The temperature sensor may be arranged in the airflow path. Preferably, the temperature sensor is arranged adjacent the air inlet fluidly connected with the airflow path. The temperature sensor may be configured as a capacitive sensor.

Alternatively or in addition to the temperature sensor, the device may comprise a heated temperature sensor. As used herein, the term ‘heated temperature sensor’ refers to a temperature sensor configured for sensing a temperature of a heated portion of the device. For example, the heated temperature sensor may sense the temperature of a heating chamber which is heated by a heating element during use of the device.

One or both of the moisture sensor and the temperature sensor may be configured to measure one or both of the moisture of the air in the airflow path and the temperature of the air in the airflow path continuously during operation of the device. The controller may control the vaporiser continuously during operation of the device based on the sensor output. A change of one or both of humidity and temperature during operation of the device can therefore be taken into account and the user experience improved.

One or both of the humidity sensor and the temperature sensor may be arranged to respectively measure one or both of the humidity and the temperature adjacent an air inlet of the device.

The device further comprises a heating chamber for heating an aerosol-forming substrate. The heating chamber may be arranged towards a downstream end of the airflow path. Alternatively or additionally, the heating chamber may be arranged downstream of the airflow path. In the latter case, the airflow path will exit into the heating chamber. The humidifier may be arranged upstream of the heating chamber.

The humidifier may be arranged between the heating chamber and one or both of the humidity sensor and the temperature sensor.

The aerosol-generating device may comprise a controller configured to receive the output of the humidity sensor. The controller may be configured to receive the output of one or both of the humidity sensor and the temperature sensor and to control operation of the humidifier on the basis of the sensor output. In one embodiment, the humidity sensor is provided and the temperature sensor is provided. The controller may be configured to receive the output of the temperature sensor and of the humidity sensor, and the controller may be configured to control operation of the humidifier on the basis of the humidity sensor output and on the basis of the temperature sensor output.

The controller may be configured to control operation of the humidifier on basis of one or both of the humidity sensor output and the temperature sensor output continuously during operation of the device.

The controller may comprise a lookup table. The lookup table may comprise one or both of air humidity data and air temperature data. The controller may be configured to control the humidifier by comparing the output of one or both of the humidity sensor and the temperature sensor with the stored data of the lookup table.

The aerosol-generating device may have a modular design. The aerosol-generating device may comprise one or more of a main module, a thermal aerosol-generating portion, and a non-thermal aerosol-generating portion. The thermal aerosol-generating portion may be configured as a heating portion. The thermal aerosol-generating portion may be configured as a heating module. The thermal aerosol-generating portion may be modular. The non-thermal aerosol-generating portion may be configured as a vaporiser portion. The non-thermal aerosol-generating portion may be configured as a vaporiser module. The non-thermal aerosol-generating portion may be modular. The non-thermal aerosol generating portion may comprise a non-thermal vaporiser. One or more of the portions may be part a monolithic structure. One or more of the portions may be permanently attached to one another. One or more of the portions may be detachably connectable to one another.

The modular design may allow for several modes of operation. For example, either one of or both of the non-thermal aerosol-generating portion and the thermal aerosol-generating portion may be present according to different modes of operation.

The main module may comprise the main electronic components of the device. The main module may comprise a power supply of the device, for example a rechargeable battery. The main module may comprise control electronics of the device.

The non-thermal aerosol-generating portion may comprise a vaporizer. The vaporizer may comprise, or may be, a humidifier. The non-thermal aerosol-generating portion may comprise a humidity sensor. The non-thermal aerosol-generating portion may comprise the controller configured to receive the output of the humidity sensor and to control operation of the humidifier on the basis of the humidity sensor output, or the controller may be arranged in the main module. The non-thermal aerosol-generating portion may comprise the cartridge receiving region configured for receiving the cartridge.

The thermal aerosol-generating portion may comprise a heating chamber for heating an aerosol-forming substrate. The heating chamber may comprise a heating element.

The non-thermal aerosol-generating portion may be arranged as a center module sandwiched between the main module and the thermal aerosol-generating portion. The main module may be arranged at the distal end of the device. The thermal aerosol-generating portion may be arranged at the proximal end of the device. The non-thermal aerosol-generating portion may be arranged upstream of the thermal aerosol-generating portion.

A distal end of the non-thermal aerosol-generating portion may be detachably connectable to a proximal end of the main module. A proximal end of the non-thermal aerosol-generating portion may be detachably connectable to a distal end of the thermal aerosol-generating portion.

Additionally, the proximal end of the main module may be directly detachably connectable to the distal end of the thermal aerosol-generating portion, thereby allowing an alternative mode of operation where the non-thermal aerosol-generating portion is omitted.

The device may further comprise a detachably connectable mouthpiece. The mouthpiece may be detachably connectable to a proximal end of the thermal aerosol-generating portion. When the mouthpiece is connected to the thermal aerosol-generating portion, a user may draw directly on the mouthpiece. When the mouthpiece is not connected to the thermal aerosol-generating portion, a user may draw directly on a mouth-end portion of an aerosol-forming article being at least partly inserted into the thermal aerosol-generating portion. Alternatively or in addition, the mouthpiece may be detachably connectable to a proximal end of the non-thermal aerosol-generating portion. In an embodiment, the thermal aerosol-generating portion integrally comprises the mouthpiece or is configured as a mouthpiece.

The modular device may thus allow for various modes of operation in presence of one or both of the non-thermal aerosol-generating portion, the thermal aerosol-generating portion, and the mouthpiece.

Detachable connecting means may comprise one or more of a magnetic connection, a screw connection, a sliding connection and a bayonet connection or any other known connection.

The aerosol-generating device may comprise a non-thermal aerosol-generating portion comprising a humidifier and a humidity sensor and a thermal aerosol-generating portion comprising a heating element, and wherein the non-thermal aerosol-generating portion may be arranged upstream of the thermal aerosol-generating portion.

The aerosol-generating device may comprise an airflow path into which ambient air is drawn and through which air flows through the device. The airflow path may comprise a first portion, a second portion and a transition portion between the first portion and the second portion. The first portion may be arranged upstream of the second portion.

The vaporizer, preferably humidifier, may be configured to increase the humidity of the air flowing through the airflow path. The vaporizer, preferably humidifier, may be arranged adjacent the transition portion of the airflow path. The transition portion of the airflow path may be arranged such that the second portion of the airflow channel downstream of the transition portion is offset with respect to a longitudinal axis of the aerosol-generating device.

The transition portion may be arranged such that the direction of the airflow path changes from the first portion to the second portion. The vaporizer may be configured to generate, in the region of the transition portion of the airflow path, a vapor from an aerosol-forming substrate.

The vaporizer and the transition portion may be arranged in a non-thermal aerosol-generating portion. The second portion of the airflow path may be at least partly arranged in the non-thermal aerosol-generating portion. The second portion of the airflow path may be fluidly connected with a coupling. The coupling may be configured to fluidly couple the non-thermal aerosol-generating portion with the thermal aerosol-generating portion.

The coupling may be offset with respect to the longitudinal axis of the aerosol-generating device. The coupling may be configured to enable a detachable coupling between the non-thermal aerosol-generating portion and the thermal aerosol-generating portion. The coupling may be configured as a Luer coupling.

The second portion of the airflow path may be at least partly arranged in the thermal aerosol-generating portion, and the second portion of the airflow path in the thermal aerosol-generating portion may at least partly direct air towards the longitudinal axis of the aerosol-generating device such that the second portion of the airflow path in the thermal aerosol-generating portion at least partly runs along the longitudinal axis of the aerosol-generating device. The redirection of the air from the second portion running at an offset to the longitudinal axis towards the part of the second portion running along the longitudinal axis may be facilitated by a second transition portion arranged in the second portion of the airflow path. By providing the first transition portion and the second transition portion, the overall length of the airflow path may be increased from the humidifier to the heating chamber of the thermal aerosol-generating portion. As a consequence, mixing of an aerosol generated by the vaporiser and ambient air is improved before this mixture reaches the aerosol-forming substrate in the thermal aerosol-generating portion.

The second portion of the airflow path may be at least partly arranged in the thermal aerosol-generating portion, and the second portion of the airflow path in the thermal aerosol-generating portion may be fluidly coupled with the coupling.

The transition portion may be arranged such that the direction of the airflow path changes from the first portion to the second portion.

The aerosol-generating device may comprise one or more air inlets. The one or more air inlets are preferably fluidly connected with the airflow path. The air inlet of the device may comprise a one-way valve. The one-way valve may be configured to open in response to a pressure drop in the airflow path. In the closed state in absence of a pressure drop in the airflow path, the one-way valve may prevent moisture, dust particles or other contaminants to enter the device via the air inlet.

The aerosol-generating device may comprise an air inlet, and the first portion of the airflow path may be arranged adjacent the air inlet.

The first portion of the airflow channel may run transversely through the aerosol-generating device with respect to the longitudinal axis of the aerosol-generating device. The first portion of the airflow channel may run radially through the aerosol-generating device with respect to the longitudinal axis of the aerosol-generating device. The first portion of the airflow channel may fluidly connect the air inlet and the first transition portion of the airflow channel.

The second portion of the airflow channel may run at least partly axially through the aerosol-generating device parallel to the longitudinal axis of the aerosol-generating device.

The second portion of the airflow channel may be fluidly connected with the transition portion of the airflow channel. The second portion of the airflow channel may be fluidly connected with one or both of the first transition portion of the airflow channel and the second transition portion of the airflow channel.

One or both of the first transition portion of the airflow channel and the second transition portion of the second portion of the airflow channel may change the direction of the airflow path by 90°.

The orientation of the vaporizer may be defined by a surface of the vaporiser. The surface may be defined by an extension plane. The extension plane may be arranged at an angle with respect to the longitudinal axis of the aerosol-generating device. The plane may be angled with respect to both the first portion and the second portion of the airflow path.

The angle between the extension plane of the vaporizer surface and the longitudinal axis of the aerosol-generating device may be between 30° and 60°, preferably between 35° and 55°, more preferably between 40° and 50°, most preferred about 45°. An angle between the extension plane of the vaporizer surface and a longitudinal axis of the first portion of the airflow path may be between 30° and 60°, preferably between 35° and 55°, more preferably between 40° and 50°, most preferred about 45°. An angle between the extension plane of the vaporizer surface and a longitudinal axis of the second portion of the airflow path may be between 30° and 60°, preferably between 35° and 55°, more preferably between 40° and 50°, most preferred about 45°.

A cross-sectional area of the transition portion of the airflow channel may be larger than a cross-sectional area of the first portion of the airflow channel. A cross-sectional area of the transition portion of the airflow channel may be larger than a cross-sectional area of the second portion of the airflow channel.

The aerosol-generating device may comprise a heating chamber for heating an aerosol-forming substrate. The heating chamber may be part of a thermal aerosol-generating portion of the device. The heating chamber may have a hollow cylindrical shape. The heating chamber may be adapted such that air may flow through the heating chamber. The airflow path may extend into the heating chamber. An opening, preferably the fluid outlet, of the cartridge may be fluidly connected with the heating chamber via the airflow path. Ambient air may be drawn into the aerosol-generating device, into the heating chamber and towards the user. An open proximal end of the heating chamber may comprise an air outlet. Downstream of the heating chamber, the mouthpiece may be arranged, or a user may directly draw on an aerosol-generating article. The airflow path may extend through the mouthpiece.

The heating chamber may comprise a heating element. The heating element may be arranged in or around the heating chamber.

In all of the aspects of the disclosure, the heating element may comprise an electrically resistive material. Suitable electrically resistive materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum platinum, gold and silver. Examples of suitable metal alloys include stainless steel, nickel-, cobalt-, chromium-, aluminium-titanium-zirconium-, hafnium-, niobium-, molybdenum-, tantalum-, tungsten-, tin-, gallium-, manganese-, gold- and iron-containing alloys, and super-alloys based on nickel, iron, cobalt, stainless steel, Timetal® and iron-manganese-aluminium based alloys. In composite materials, the electrically resistive material may optionally be embedded in, encapsulated or coated with an insulating material or vice-versa, depending on the kinetics of energy transfer and the external physicochemical properties required.

As described, in any of the aspects of the disclosure, the heating element may be part of an aerosol-generating device. The aerosol-generating device may comprise an internal heating element or an external heating element, or both internal and external heating elements, where "internal" and "external" refer to the aerosol-forming substrate. An internal heating element may take any suitable form. For example, an internal heating element may take the form of a heating blade. Alternatively, the internal heater may take the form of a casing or substrate having different electro-conductive portions, or an electrically resistive metallic tube. Alternatively, the internal heating element may be one or more heating needles or rods that run through the center of the aerosol-forming substrate. Other alternatives include a heating wire or filament, for example a Ni—Cr (Nickel-Chromium), platinum, tungsten or alloy wire or a heating plate. Optionally, the internal heating element may be deposited in or on a rigid carrier material. In one such embodiment, the electrically resistive heating element may be formed using a metal having a defined relationship between temperature and resistivity. In such an exemplary device, the metal may be formed as a track on a suitable insulating material, such as ceramic material, and then sandwiched in another insulating material, such as a glass. Heaters formed in this manner may be used to both heat and monitor the temperature of the heating elements during operation.

An external heating element may take any suitable form. For example, an external heating element may take the form of one or more flexible heating foils on a dielectric substrate, such as polyimide. The flexible heating foils can be shaped to conform to the perimeter of the substrate receiving heating chamber. Alternatively, an external heating element may take the form of a metallic grid or grids, a flexible printed circuit board, a molded interconnect device (MID), ceramic heater, flexible carbon fibre heater or may be formed using a coating technique, such as plasma vapour deposition, on a suitable shaped substrate. An external heating element may also be formed using a metal having a defined relationship between temperature and resistivity. In such an exemplary device, the metal may be formed as a track between two layers of suitable insulating materials. An external heating element formed in this manner may be used to both heat and monitor the temperature of the external heating element during operation.

The internal or external heating element may comprise a heat sink, or heat reservoir comprising a material capable of absorbing and storing heat and subsequently releasing the heat over time to the aerosol-forming substrate. The heat sink may be formed of any suitable material, such as a suitable metal or ceramic material. In one embodiment, the material has a high heat capacity (sensible heat storage material), or is a material capable of absorbing and subsequently releasing heat via a reversible process, such as a high temperature phase change. Suitable sensible heat storage materials include silica gel, alumina, carbon, glass mat, glass fibre, minerals, a metal or alloy such as aluminium, silver or lead, and a cellulose material such as paper. Other suitable materials which release heat via a reversible phase change include paraffin, sodium acetate, naphthalene, wax, polyethylene oxide, a metal, metal salt, a mixture of eutectic salts or an alloy. The heat sink or heat reservoir may be arranged such that it is directly in contact with the aerosol-forming substrate and can transfer the stored heat directly to the substrate. Alternatively, the heat stored in the heat sink or heat reservoir may be transferred to the aerosol-forming substrate by means of a heat conductor, such as a metallic tube.

The heating element advantageously heats the aerosol-forming substrate by means of conduction. The heating element may be at least partially in contact with the substrate, or the carrier on which the substrate is deposited. Alternatively, the heat from either an internal or external heating element may be conducted to the substrate by means of a heat conductive element.

During operation, the aerosol-forming substrate may be completely contained within the aerosol-generating device. In that case, a user may puff on a mouthpiece of the aerosol-generating device. Alternatively, during operation a smoking article containing the aerosol-forming substrate may be partially contained within the aerosol-generating device. In that case, the user may puff directly on the smoking article.

The heating element may be configured as an induction heating element. The induction heating element may comprise an induction coil and a susceptor. In general, a susceptor is a material that is capable of generating heat, when penetrated by an alternating magnetic field. If the susceptor is conductive, then typically eddy currents are induced by the alternating magnetic field. If the susceptor is magnetic, then typically another effect that contributes to the heating is commonly referred to hysteresis losses. Hysteresis losses occur mainly due to the movement of the magnetic domain blocks within the susceptor, because the magnetic orientation of the magnetic domain blocks will align with the magnetic induction field, which alternates. Another effect contributing to the hysteresis loss is when the magnetic domains will grow or shrink within the susceptor. Commonly all these changes in the susceptor that happen on a nano-scale or below are referred to as "hysteresis losses", because they produce heat in the susceptor. Hence, if the susceptor is both magnetic and electrically conductive, both hysteresis losses and the generation of eddy currents will contribute to the heating of the susceptor. If the susceptor is magnetic, but not conductive, then hysteresis losses will be the only means by which the susceptor will heat, when penetrated by an alternating magnetic field. According to the invention, the susceptor may be electrically conductive or magnetic or both electrically conductive and magnetic. An alternating magnetic field generated by one or several induction coils heats the susceptor. The susceptor then transfers the heat to the aerosol-forming substrate, such that an aerosol is formed. The heat transfer may be mainly by conduction of heat. Such a transfer of heat is best, if the susceptor is in close thermal contact with the aerosol-forming substrate. When an induction heating element is employed, the induction heating element may be configured as an internal heating element as described herein or as an external heater as described herein. If the induction heating element is configured as an internal heating element, the susceptor element is preferably configured as a pin or blade for penetrating the aerosol-generating article. If the induction heating element is configured as an external heating element, the susceptor element is preferably configured as a cylindrical susceptor at least partly surrounding the heating chamber or forming the sidewall of the heating chamber.

The aerosol-generating device may be a handheld aerosol-generating device.

Preferably, the aerosol-generating device is portable. The aerosol-generating device may have a size comparable to a conventional cigar or cigarette. The device may be an electrically operated smoking device. The device may be a handheld aerosol-generating device. The aerosol-generating device may have a total length between 30 millimetres and 150 millimetres in a direction along the longitudinal axis of the device. The aerosol-generating device may have an external diameter between 5 millimetres and 30 millimetres in a transverse direction with respect to the longitudinal axis of the aerosol-generating device. The external diameter may be constant or may vary along the longitudinal axis of the device.

The transverse cross-sectional area may be of any desired shape. For example, the transverse cross-sectional area may be oval, round, or rectangular. The shape of the transverse cross-sectional area may be constant or may vary along the longitudinal axis of the device.

The aerosol-generating device may comprise a housing. The housing may be elongate. The housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. Preferably, the material is light and non-brittle.

The housing may comprise at least one air inlet. The housing may comprise more than one air inlet. The air inlet is preferably fluidly connected with the airflow path.

According to an embodiment of the invention, there is provided a cartridge as described herein for use with an aerosol-generating device.

According to an embodiment of the invention, there is provided an aerosol-generating system comprising an aerosol-generating device as described herein and an aerosol-forming substrate. The aerosol forming substrate may be part of an aerosol-generating article as described herein. The aerosol-forming substrate may be heated in a heating chamber of the device, and the heating chamber may be arranged towards a downstream end of the airflow path, and the humidifier may be arranged upstream of the heating chamber.

As used herein the term 'liquid sensorial media' relates to a liquid composition capable of modifying an airflow in contact with the liquid sensorial media. A vaporizer may be used to bring the liquid sensorial media in contact with the airflow. The modification of the airflow may be one or more of forming an aerosol or a vapor, cooling an airflow, filtering an airflow, and increasing air humidity of an airflow.

For example, the liquid sensorial media may consist of, or may substantially consist of, water. The liquid sensorial media may be dispersed into the airflow by means of a humidifier. Thereby, humidity of the airflow may be increased. The provision of a humidifier may advantageously allow to provide an airflow with a constant air humidity independent of the air humidity of the environment. For example, this allows to compensate for a situation where, during use, the device is used in a cold environment with low air humidity.

For example, the liquid sensorial media may comprise an aerosol-forming substrate capable of releasing volatile compounds that can form an aerosol or a vapor. Preferably, the aerosol-forming substrate in the liquid sensorial media is a flavorant or comprises a flavorant.

As used herein, the term 'aerosol-forming substrate' relates to a substrate capable of releasing volatile compounds that can form an aerosol or a vapor. Such volatile compounds may be released by heating the aerosol-forming substrate. The aerosol-forming substrate may be in solid form or may be in liquid form. The terms 'aerosol' and 'vapor' are used synonymously.

The aerosol-forming substrate may be part of an aerosol-generating article. The aerosol-forming substrate may be part of the liquid held in the liquid storage portion. The aerosol-forming substrate may be part of the liquid sensorial media held in the liquid storage portion. The liquid storage portion may contain a liquid aerosol-forming substrate. Alternatively or in addition, the liquid storage portion may contain a solid aerosol-forming substrate. For example, the liquid storage portion may contain a suspension of a solid aerosol-forming substrate and a liquid. Preferably, the liquid storage portion contains a liquid aerosol-forming substrate.

The aerosol-forming substrate described herein may be one or both of the aerosol-forming substrate contained in the liquid storage portion and the aerosol-forming substrate comprised in the aerosol-generating article. Preferably, a liquid nicotine or flavor/flavorant containing aerosol-forming substrate may be employed in the liquid storage portion of the cartridge, while a solid tobacco containing aerosol-forming substrate may be employed in the aerosol-generating article.

The aerosol-forming substrate may comprise nicotine. The nicotine-containing aerosol-forming substrate may be a nicotine salt matrix.

The aerosol-forming substrate may comprise plant-based material. The aerosol-forming substrate may comprise tobacco. The aerosol-forming substrate may comprise a tobacco-containing material including volatile tobacco flavour compounds which are released from the aerosol-forming substrate upon heating. Alternatively, the aerosol-forming substrate may comprise a non-tobacco material. The aerosol-forming substrate may comprise homogenised plant-based material. The aerosol-forming substrate may comprise homogenised tobacco material. Homogenised tobacco material may be formed by agglomerating particulate tobacco. In a particularly preferred embodiment, the aerosol-forming substrate may comprise a gathered crimped sheet of homogenised tobacco material. As used herein, the term 'crimped sheet' denotes a sheet having a plurality of substantially parallel ridges or corrugations.

The aerosol-forming substrate may comprise at least one aerosol-former. An aerosol-former is any suitable known compound or mixture of compounds that, in use, facilitates formation of a dense and stable aerosol and that is substantially resistant to thermal degradation at the temperature of operation of the device. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Preferred aerosol formers are polyhydric alcohols or mixtures thereof, such as triethylene glycol, 1, 3-butanediol. Preferably, the aerosol former is glycerine. Where present, the homogenised tobacco material may have an aerosol-former content of equal to or greater than 5 percent by weight on a dry weight basis, and preferably from 5 percent to 30 percent by weight on a dry weight basis. The aerosol-forming substrate may comprise other additives and ingredients, such as flavourants.

As used herein, the term 'aerosol-generating article' refers to an article comprising an aerosol-forming substrate that is capable of releasing volatile compounds that can form an aerosol. For example, an aerosol-generating article may be an article that generates an aerosol that is directly inhalable by the user drawing or puffing on a mouthpiece at a user-end of the device. An aerosol-generating article may be disposable.

The aerosol-generating article and the heating chamber of the aerosol-generating device may be arranged such that the aerosol-generating article is partially received within the heating chamber of the aerosol-generating device. The heating chamber of the aerosol-generating device and the aerosol-generating article may be arranged such that the aerosol-generating article is entirely received within the heating chamber of the aerosol-generating device.

The aerosol-generating article may have a length and a circumference substantially perpendicular to the length. The aerosol-forming substrate may be provided as an aerosol-forming segment containing an aerosol-forming substrate. The aerosol-forming segment may be substantially cylindrical in shape. The aerosol-forming segment may be substantially elongate. The aerosol-forming segment may also have a length and a circumference substantially perpendicular to the length.

As used herein, the term 'liquid storage portion' refers to a storage portion comprising a liquid sensorial media and, additionally or alternatively, an aerosol-forming substrate that is capable of releasing volatile compounds that can form an aerosol.

As used herein, the term 'aerosol-generating device' refers to a device that interacts with one or both of an aerosol-generating article and a cartridge to generate an aerosol.

As used herein, the term 'aerosol-generating system' refers to the combination of the aerosol-generating article, as further described and illustrated herein, with an aerosol-generating device, as further described and illustrated herein. In the system, the aerosol-generating device and one or both of the aerosol-generating article and the cartridge cooperate to generate a respirable aerosol.

As used herein, the term 'mouthpiece' refers to a portion of an aerosol-generating device that is placed into a user's mouth in order to directly inhale an aerosol generated by the aerosol-generating device from an aerosol-generating article received in the heating chamber of the device and/or from the liquid received in the liquid storage portion of the cartridge.

Operation of the heating element may be triggered by a puff detection system. Alternatively, the heating element may be triggered by pressing an on-off button, held for the duration of the user's puff. The puff detection system may be provided as a sensor, which may be configured as an airflow sensor to measure the airflow rate. The airflow rate is a parameter characterizing the amount of air that is drawn through the airflow path of the aerosol-generating device per time by the user. The initiation of the puff may be detected by the airflow sensor when the airflow exceeds a predetermined threshold. Initiation may also be detected upon a user activating a button.

The sensor may also be configured as a pressure sensor. When the user draws on the aerosol-generating device, a negative pressure or vacuum is generated inside the device, wherein the negative pressure may be detected by the pressure sensor. The term "negative pressure" is to be understood as a pressure which is lower than the pressure of ambient air. In other words, when the user draws on the device, the air which is drawn through the device has a pressure which is lower than the pressure of ambient air outside of the device.

The aerosol-generating device may include a user interface to activate the aerosol-generating device, for example a button to initiate heating of the aerosol-generating device or a display to indicate a state of the aerosol-generating device or of the aerosol-forming substrate.

The aerosol-generating device may include additional components, such as, for example a charging unit for recharging an on-board electric power supply in an electric aerosol-generating device.

As used herein, the term 'proximal' refers to a user-end, or mouth-end of the aerosol-generating device or a part or portion thereof, and the term 'distal' refers to the end opposite to the proximal end. When referring to the heating chamber, the term 'proximal' refers to the region closest to the open end of the heating chamber and the term 'distal' refers to the region closest to the closed end.

As used herein, the terms 'upstream' and 'downstream' are used to describe the relative positions of components, or portions of components, of the aerosol-generating device in relation to the direction in which a user draws on the aerosol-generating device during use thereof.

Below, there is provided a non-exhaustive list of non-limiting examples. Any one or more of the features of these examples may be combined with any one or more features of another example or embodiment described herein.

Example A: Handheld aerosol-generating device comprising a cartridge receiving region configured for receiving a cartridge, the cartridge comprising a liquid aerosol-forming substrate, wherein the cartridge receiving region comprises an opening element, wherein the opening element is configured to pierce a sealing foil of the cartridge, when the cartridge is received in the cartridge receiving region.

Example B: Handheld aerosol-generating device according to example A, wherein the cartridge receiving region comprises a liquid passage.

Example C: Handheld aerosol-generating device according to example B, wherein the liquid passage is arranged to establish a liquid connection between the handheld aerosol-generating device and the cartridge, when the cartridge is received in the cartridge receiving region and the sealing foil is pierced by the opening element.

Example D: Handheld aerosol-generating device according to example C, wherein the opening element at least partly surrounds the liquid passage, preferably fully surrounds the liquid passage.

Example E: Handheld aerosol-generating device according to any of the preceding examples, wherein the opening element comprises a blade for slicing the sealing foil of the cartridge, when the cartridge is received in the cartridge receiving region.

Example F: Handheld aerosol-generating device according to any of the preceding examples, wherein the opening element comprises a double-blade for slicing the sealing foil of the cartridge, when the cartridge is received in the cartridge receiving region.

Example G: Handheld aerosol-generating device according to example F, wherein the double-blade is configured to slice the sealing foil of the cartridge independent of the insertion direction of the cartridge into the cartridge receiving region.

Example H: Handheld aerosol-generating device according to any of the preceding examples, wherein the handheld aerosol-generating device further comprises a sealing element.

Example I: Handheld aerosol-generating device according to example H, wherein the sealing element is arranged to prevent leakage of liquid aerosol-forming substrate, when the cartridge is received in the cartridge receiving region and the sealing foil is pierced by the opening element.

Example J: Handheld aerosol-generating device according to example H or I, wherein the sealing element at least partly surrounds the opening element, preferably fully surrounds the opening element.

Example K: Handheld aerosol-generating device according to any of examples H to J, wherein the sealing element comprises a sealing ring, preferably wherein the sealing element is a sealing ring.

Example L: Handheld aerosol-generating device according to any of examples H to K, wherein the sealing element comprises an O-ring, preferably wherein the sealing element is an O-ring.

Example M: Handheld aerosol-generating device according to any of the preceding examples, wherein handheld aerosol-generating device further comprises a vaporizer, wherein the vaporizer is preferably configured as a nebulizer, more preferably wherein the nebulizer comprises a vibrating micro-perforated mesh, even more preferably wherein the vibrating micro-perforated mesh comprises a palladium perforated vibrating plate.

Example N: Handheld aerosol-generating device according to example M, wherein the vaporizer is fluidly connected with the cartridge, when the cartridge is received in the cartridge receiving region and the sealing foil is pierced by the opening element.

Example O: Handheld aerosol-generating device according to example M or N, wherein the vaporizer is fluidly connected with the cartridge via the liquid passage of any of examples 2 to 4.

Example P: Handheld aerosol-generating device according to any of the preceding examples, wherein the cartridge receiving region is configured to receive the cartridge transversally from either of both sides of the device.

Example Q: Handheld aerosol-generating device according to any of the preceding examples, wherein the cartridge receiving region and the opening element are arranged in a non-thermal aerosol-generating portion of the handheld aerosol-generating device, wherein the handheld aerosol-generating device further comprises a thermal aerosol-generating portion comprising a heating element, and wherein the non-thermal aerosol-generating portion is arranged upstream of the thermal aerosol-generating portion.

Example R: Handheld aerosol-generating system comprising a handheld aerosol-generating device according to any of the preceding examples and a cartridge, the cartridge comprising a liquid aerosol-forming substrate.

Example S: Handheld aerosol-generating system of example R, wherein the cartridge comprises a liquid outlet allowing the liquid aerosol-forming substrate to flow out of the cartridge, wherein the liquid outlet is sealed by a sealing foil, wherein the sealing foil is arranged to be pierced by the opening element, when the cartridge is received in the cartridge receiving region.

Example T: Handheld aerosol-generating system of example R or S, wherein the cartridge receiving region and the cartridge are configured to allow transversal insertion of the cartridge into the cartridge receiving region from either of both sides of the device.

Example U: Method of attaching a cartridge comprising a liquid aerosol-forming substrate with a handheld aerosol-generating device, the method comprising the steps of:

providing a handheld aerosol-generating system of any of examples R to T, inserting the cartridge into the cartridge receiving region of the handheld aerosol-generating device, piercing, by means of the opening element, the sealing foil of the cartridge thereby establishing a fluid connection between the cartridge and the handheld aerosol-generating device.

Features described in relation to one embodiment may equally be applied to other embodiments of the invention.

The invention will be further described, by way of example only, with reference to the accompanying drawings in which.

Figure 1:
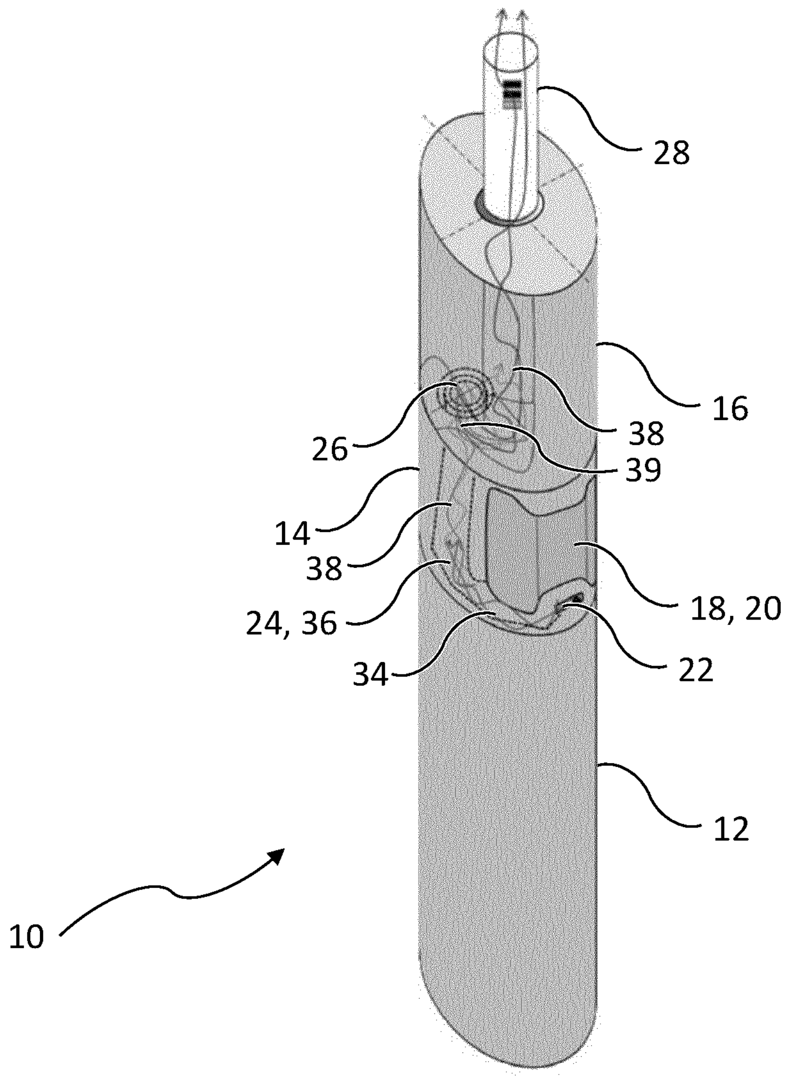
FIG. 1 shows an aerosol-generating device.

FIG. 1 shows a handheld aerosol-generating device 10. The handheld aerosol-generating device 10 comprises a main body 12. The main body 12 comprises a power supply in the form of a battery. The main body 12 may further comprises electric circuitry.

The handheld aerosol-generating device 10 comprises a non-thermal aerosol-generating portion 14. The non-thermal aerosol-generating portion 14 is arranged adjacent the main body 12. The non-thermal aerosol-generating portion 14 is configured removably attachable to the main body 12 or integrally formed with the main body 12.

Adjacent the non-thermal aerosol-generating portion 14, a thermal aerosol-generating portion 16 is provided. The non-thermal aerosol-generating portion 14 is sandwiched between the thermal aerosol-generating portion 16 and the main body 12 of the handheld aerosol-generating device 10.

In the non-thermal aerosol-generating portion 14, a cartridge receiving region 18 is provided. The cartridge receiving region 18 is configured for receiving a cartridge 20. The cartridge 20 comprises a liquid sensorial media. Preferably, the cartridge 20 comprises a nicotine-containing sensorial media. As an alternative, the cartridge 20 may comprise purely water. The cartridge 20 may comprise any liquid sensorial media that is preferred.

The cartridge 20 is configured as a removably attachable cartridge 20. After the liquid sensorial media in the cartridge 20 is depleted, the depleted cartridge 20 may be removed from the cartridge receiving region 18 and a fresh cartridge 20 may be attached to the cartridge receiving region 18. As an alternative, the cartridge 20 may be refillable after the liquid sensorial media from the cartridge 20 is depleted.

The cartridge receiving region 18 is shaped such that the cartridge 20 can only be inserted into the cartridge receiving region 18 unidirectionally. A mishandling or damaging of the cartridge 20 of the cartridge receiving region 18 is thereby prevented.

An air inlet 22 is provided in the non-thermal aerosol-generating portion 14. More than one air inlet 22 or a multitude of air inlets 22 may alternatively be provided. The air inlet 22 is arranged in the periphery of the non-thermal aerosol-generating portion 14 to allow ambient air to be drawn into the handheld aerosol-generating device 10.

Fluidly connected with the air inlet 22, an airflow path 24 is provided. The airflow path 24 extends from the air inlet 22 through the handheld aerosol-generating device 10. Adjacent the air inlet 22, the airflow path 24 runs through the non-thermal aerosol-generating portion 14. Subsequently, the airflow path 24 continues through the thermal aerosol-generating portion 16.

Between the non-thermal aerosol-generating portion 14 and the thermal aerosol-generating portion 16, a coupling 26 is provided. The coupling 26 may enable to removably attach the thermal aerosol-generating portion 16 to the non-thermal aerosol-generating portion 14 or vice versa. In an alternative embodiment, the coupling 26 is a fixed coupling 26 so that the thermal aerosol-generating portion 16 is permanently attached to the non-thermal aerosol-generating portion 14.

The airflow path 24 runs through the coupling 26. In other words, the coupling 26 facilitates a fluid connection between the non-thermal aerosol-generating portion 14 and the thermal aerosol-generating portion 16. Exemplarily, the coupling 26 may be a Luer coupling 26.

In the embodiment shown in FIG. 1, an aerosol-generating article 28 is inserted into a cavity of the thermal aerosol-generating portion 16. The cavity is configured as a heating chamber. A heating element is arranged in the thermal aerosol-generating portion 16. The heating element may be a resistive heating element in the form of a heating blade or pin penetrating into the aerosol-generating article 28, when the aerosol-generating article 28 is received in the cavity. The heating element may alternatively be arranged at least partly surrounding the cavity. The heating element may be configured as an induction heating element. In this case, the heating element comprises an induction coil surrounding a susceptor. The susceptor may be a tubular susceptor arranged at least partly surrounding the cavity.

The aerosol-generating article 28 comprises a solid aerosol-forming substrate. The cavity into which the aerosol-generating article 28 is inserted is arranged at a downstream end of the airflow path 24. The airflow path 24 terminates into the cavity. The air flows from the air inlet 22 through the non-thermal aerosol-generating portion 14, through the coupling 26 and through the thermal aerosol-generating portion 16 into the cavity. When the air flows into the cavity, the air flows through the aerosol-forming substrate of the aerosol-generating article 28. The aerosol-generating article 28 is at the same time heated by the heating element so that an aerosol is generated. The aerosol flows out of the aerosol-generating article 28 at a proximal or downstream end of the aerosol-generating article 28.

To improve the aerosol generation, the non-thermal aerosol-generating portion 14 comprises a humidity sensor. In addition or alternatively to the humidity sensor, a temperature sensor may be provided. The humidity sensor is configured to measure the humidity of the air flowing into the airflow path 24 through the air inlet 22. The temperature sensor is configured to measure the temperature of the air flowing into the airflow path 24 through the air inlet 22. The temperature of the air may be indicative of the humidity of the air.

The aerosol generation in the thermal aerosol-generating portion 16, facilitated by the heating element heating the aerosol-forming substrate of the aerosol-generating article 28, depends upon the humidity of the inflowing air. For improving the generated aerosol, it may be necessary to increase the humidity of the inflowing air in dry climates or in climates with a low humidity.

For this reason, the non-thermal aerosol-generating portion 14 comprises a vaporizer. The handheld aerosol-generating device 10 further comprises a controller. The controller may be arranged in the non-thermal aerosol-generating portion 14. Alternatively, the controller may be part of the electric circuitry arranged in the main body 12 of the handheld aerosol-generating device 10. The controller is configured to control operation of the vaporizer. The vaporizer is configured to vaporize the liquid sensorial media from the cartridge 20. The vaporized air created by the vaporizer mixes with the ambient air flowing through the airflow path 24 so that the humidity of the air is increased. The vaporizer is arranged adjacent the airflow path 24.

The airflow path 24 comprises a first portion 34 of the airflow path 24, a transition portion 36 of the airflow path 24 and a second portion 38 of the airflow path 24. The vaporizer is arranged next to the transition portion 36. In FIG. 1, the vaporizer is hidden by the transition portion 36. The first portion 34 of the airflow path 24 is arranged adjacent the air inlet 22. The humidity sensor or at the temperature sensor are preferably arranged in the first portion 34 of the airflow path 24. Downstream of the first portion 34 of the airflow path 24, the transition portion 36 of the airflow path 24 is provided. The transition portion 36 of the airflow path 24 fluidly connects the first portion 34 of the airflow path 24 with the second portion 38 of the airflow path 24. The second portion 38 of the airflow path 24 is partly arranged in the non-thermal aerosol-generating portion 14 and partly arranged in the thermal aerosol-generating portion 16.

The vaporizer is arranged at the transition portion 36 of the airflow path 24. The transition portion 36 of the airflow path 24 has a larger cross-section than the cross-section of the first portion 34 of the airflow path 24 and the cross-section of the second portion 38 of the airflow path 24. The transition portion therefore improves the mixing of the aerosol generated by the vaporizer with the ambient air flowing through the airflow path 24.

The transition portion is offset with respect to the longitudinal axis of the handheld aerosol-generating device 10. As a consequence, the second portion 38 of the airflow path 24 is also offset with respect to the longitudinal axis of the handheld aerosol-generating device 10. As shown in FIG. 1, the air flows parallel to the longitudinal axis of the handheld aerosol-generating device 10 in the second portion 38 of the airflow path 24 in the non-thermal aerosol-generating portion 14. This is due to the offset of the transition portion 36 of the airflow path 24 and the offset of the second portion 38 of the airflow path 24. After passing through the coupling 26 and entering the thermal aerosol-generating portion 16, the air with increased humidity passes a second transition portion 39 of the second portion 38 of the airflow path 24 redirecting the air to flow along the longitudinal axis of the handheld aerosol-generating device 10. The air with increased humidity then enters the cavity in which the aerosol-generating article 28 comprising the aerosol-forming substrate is received. The cavity is preferably along the longitudinal axis of the handheld aerosol-generating device 10.

As an alternative to the thermal aerosol-generating portion 16 having a cavity for receiving an aerosol-generating article 28, the thermal aerosol-generating portion 16 may be configured as a mouthpiece without having a cavity for receiving an aerosol-generating article 28 comprising a solid aerosol-forming substrate. This embodiment is preferred if the cartridge comprises a sensorial media comprising one or both of nicotine and flavorant so that the generated aerosol can directly be inhaled by a user.

The operation of the vaporizer is improved by providing one or both of the humidity sensor and the temperature sensor. In an environment with high humidity ambient air, the sensor output may be utilized by the controller to operate the vaporizer only marginally or even deactivating the vaporizer. However, in a low humidity ambient air environment, the need for increasing the humidity of the air may be high so that the controller may activate the vaporizer accordingly in response to the sensor output of the humidity sensor.

Exemplarily, the controller will activate the vaporizer, when the humidity sensor detects that the ambient air drawn into the airflow path 24 has a low humidity.

A lookup table may be provided comprising one or more of humidity data and temperature data. The controller may control operation of the vaporizer in response to the detected output of one or both of the humidity sensor at the temperature sensor and comparing this output with the lookup table. Both the humidity of the air as well as the temperature of the air may be utilized for controlling the vaporizer by the controller such that the humidity of the air is controlled for optimized aerosol generation.

Figure 2:
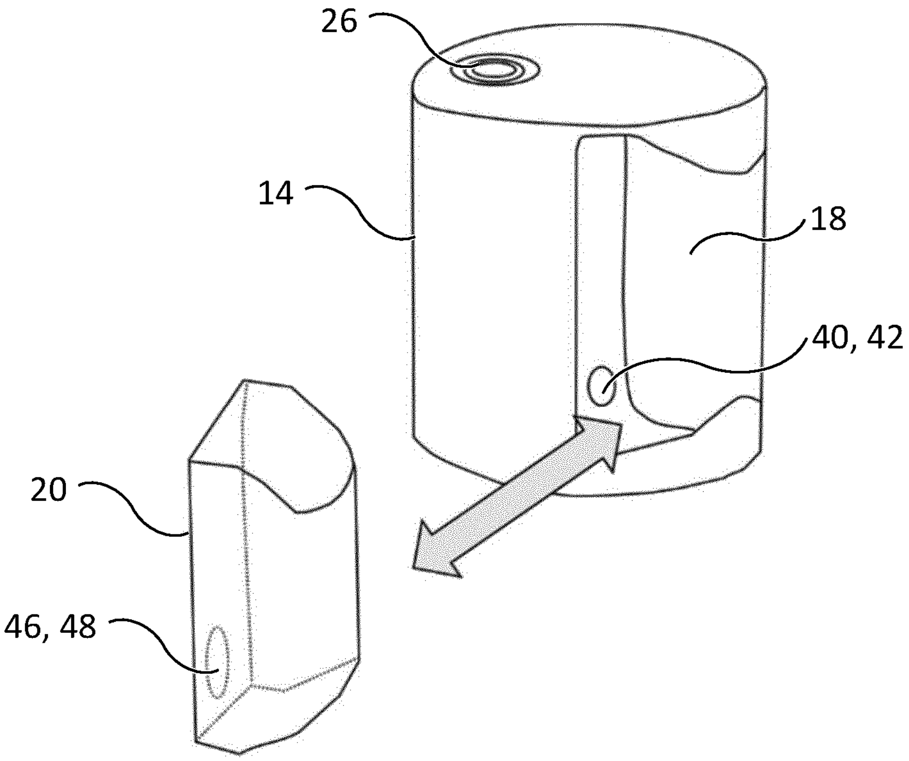
FIG. 2 shows a non-thermal aerosol-generating portion of the aerosol-generating device comprising a cartridge receiving region.

FIG. 2 shows the cartridge receiving region 18 of the non-thermal aerosol-generating portion 14 of the handheld aerosol-generating device 10. The cartridge receiving region 18 is shaped such that the cartridge 20 can only be inserted unidirectionally or at maximum in a first transversal direction and in a second opposite transversal direction.

FIG. 2 also shows an opening element 40 of the cartridge receiving region 18. The opening element 40 is configured to open a sealing foil 48 that blocks a liquid outlet 46 of the cartridge 20 before use. While conventionally the sealing foil 48 would have to be manually removed by a user from the cartridge 20 before usage, the opening element 40 automatically opens the sealing foil 48 during insertion of the cartridge 20 into the cartridge receiving region 18 of the aerosol-generating device.

Figure 3:
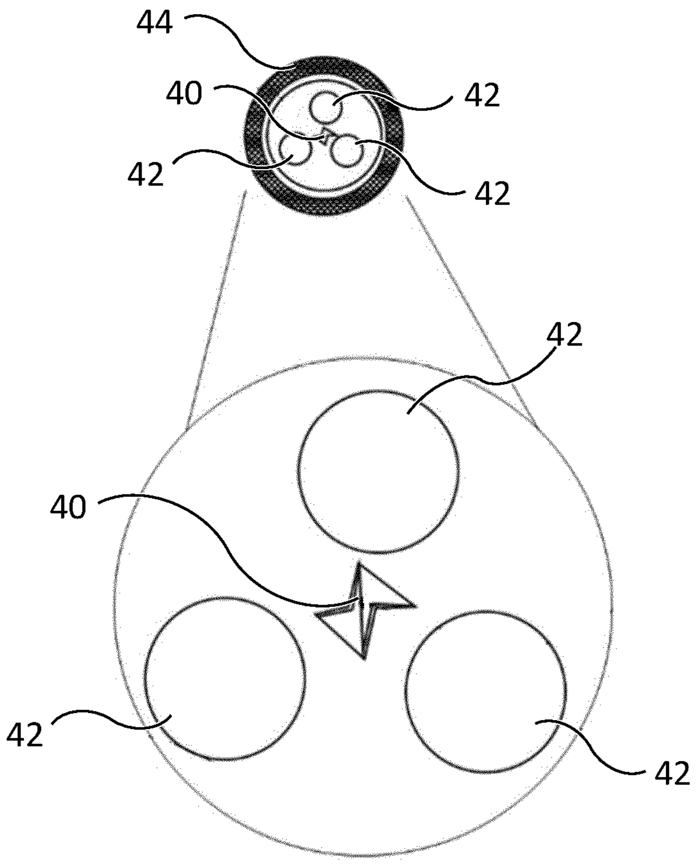
FIG. 3 shows an opening element arranged in the cartridge receiving region.

FIG. 3 is a more detailed view of the opening element 40. In the embodiment shown in FIG. 3, the opening element 40 is configured as a double blade. The two blades of this opening element 40 embodiment are arranged opposite to each other facing in different directions. Each blade is angled with respect to an insertion direction of the cartridge 20. Each blade is configured to slice the sealing foil 48 of the cartridge 20, when the cartridge 20 is inserted in a specific transversal direction into the cartridge receiving region 18. Exemplarily, the first blade is configured to slice the sealing foil 48 of the cartridge 20, when the cartridge is inserted in a first transversal direction and the second blade is configured to slice the sealing foil 48 of the cartridge 20, when the cartridge 20 is inserted in an opposite second transversal direction.

FIG. 3 further shows a liquid passage 42 arranged in the cartridge receiving region 18. The liquid passage 42 is configured as three individual apertures arranged surrounding the opening element 40. Of course, the number of apertures can be chosen appropriately.

Exemplarily, the liquid passage 42 may be configured as a single aperture, as two apertures, as four apertures or as a multitude of apertures. The liquid passage 42 can be configured as apertures surrounding the opening element 40. Alternatively, the liquid passage 42 may be arranged at the center of the opening element 40. The liquid passage 42 is in liquid communication with the vaporizer of the non-thermal aerosol-generating portion 14 so that the liquid sensorial media from the cartridge is supplied to the vaporizer through the liquid passage 42 after the opening element 40 has opened the sealing foil 48.

FIG. 3 further shows a sealing element 44 surrounding the cartridge receiving region 18. The sealing element 44 is configured as an O-ring. The sealing element 44 ensures that no a liquid sensorial media leaks from the cartridge 20 after the cartridge 20 is received in the cartridge receiving region 18 and the sealing foil 48 of the cartridge 20 has been opened by the opening element 40.

The invention claimed is:

1. A handheld aerosol-generating device comprising a cartridge receiving region configured to receive a cartridge, the cartridge comprising a liquid aerosol-forming substrate, wherein the cartridge receiving region comprises an opening element, wherein the opening element is configured to pierce a sealing foil of the cartridge when the cartridge is received in the cartridge receiving region, and wherein the cartridge receiving region is configured to receive the cartridge transversally from either of both sides of the device.

2. The handheld aerosol-generating device according to claim 1, wherein the cartridge receiving region comprises a liquid passage.

3. The handheld aerosol-generating device according to claim 2, wherein the liquid passage is arranged to establish a liquid connection between the handheld aerosol-generating device and the cartridge, when the cartridge is received in the cartridge receiving region and the sealing foil is pierced by the opening element.

4. The handheld aerosol-generating device according to claim 2, wherein the liquid passage is arranged to establish a liquid connection between the handheld aerosol-generating device and the cartridge, when the cartridge is received in the cartridge receiving region and the sealing foil is pierced by the opening element, and wherein the opening element at least partly surrounds the liquid passage, more preferably fully surrounds the liquid passage.

5. The handheld aerosol-generating device according to claim 2, wherein the liquid passage is arranged to establish a liquid connection between the handheld aerosol-generating device and the cartridge, when the cartridge is received in the cartridge receiving region and the sealing foil is pierced by the opening element, and wherein the opening element fully surrounds the liquid passage.

6. The handheld aerosol-generating device according to claim 1, wherein the opening element comprises a blade configured to slice the sealing foil of the cartridge when the cartridge is received in the cartridge receiving region.

7. The handheld aerosol-generating device according to claim 1, wherein the opening element comprises a double-blade configured to slice the sealing foil of the cartridge when the cartridge is received in the cartridge receiving region.

8. The handheld aerosol-generating device according to claim 7, wherein the double-blade is further configured to slice the sealing foil of the cartridge independently of an insertion direction of the cartridge into the cartridge receiving region.

9. The handheld aerosol-generating device according to claim 1, wherein the handheld aerosol-generating device further comprises a vaporizer.

10. The handheld aerosol-generating device according to claim 9, wherein the vaporizer is configured as a nebulizer.

11. The handheld aerosol-generating device according to claim 10, wherein the nebulizer comprises a vibrating micro-perforated mesh.

12. The handheld aerosol-generating device according to claim 11, wherein the vibrating micro-perforated mesh comprises a palladium-perforated vibrating plate.

13. The handheld aerosol-generating device according to claim 9, wherein the vaporizer is fluidly connected with the cartridge when the cartridge is received in the cartridge receiving region and the sealing foil is pierced by the opening element.

14. The handheld aerosol-generating device according to claim 9, wherein the cartridge receiving region comprises a liquid passage, and wherein the vaporizer is fluidly connected with the cartridge via the liquid passage.

15. The handheld aerosol-generating device according to claim 1, wherein the cartridge receiving region and the opening element are arranged in a non-thermal aerosol-generating portion of the handheld aerosol-generating device, wherein the handheld aerosol-generating device further comprises a thermal aerosol-generating portion comprising a heating element, and wherein the non-thermal aerosol-generating portion is arranged upstream of the thermal aerosol-generating portion.

16. A handheld aerosol-generating system comprising a handheld aerosol-generating device according to claim 1 and a cartridge, the cartridge comprising a liquid aerosol-forming substrate.

17. The handheld aerosol-generating system according to claim 16, wherein the cartridge further comprises a liquid outlet allowing the liquid aerosol-forming substrate to flow out of the cartridge, wherein the liquid outlet is sealed by a sealing foil, and wherein the sealing foil is arranged to be pierced by the opening element when the cartridge is received in the cartridge receiving region.

18. The handheld aerosol-generating system according to claim 16, wherein the cartridge receiving region and the cartridge are further configured to allow transversal insertion of the cartridge into the cartridge receiving region from either of both sides of the device.

19. A method of attaching a cartridge comprising a liquid aerosol-forming substrate with a handheld aerosol-generating device, the method comprising the steps of:

providing a handheld aerosol-generating system according to claim 16;

inserting the cartridge into the cartridge receiving region of the handheld aerosol-generating device; and piercing, by means of the opening element, the sealing foil of the cartridge thereby establishing a fluid connection between the cartridge and the handheld aerosol-generating device.

* * * * *